US007127069B2

(12) United States Patent
Nguyen

(10) Patent No.: US 7,127,069 B2
(45) Date of Patent: Oct. 24, 2006

(54) SECURED VIRTUAL NETWORK IN A GAMING ENVIRONMENT

(75) Inventor: Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 748 days.

(21) Appl. No.: 09/732,650

(22) Filed: Dec. 7, 2000

(65) Prior Publication Data

US 2002/0071557 A1 Jun. 13, 2002

(51) Int. Cl.
*H04L 9/08* (2006.01)
(52) U.S. Cl. .................................... 380/278; 463/29
(58) Field of Classification Search ............... 463/29; 350/251; 705/59; 713/200, 201; 380/278
See application file for complete search history.

(56) References Cited

U.S. PATENT DOCUMENTS

| 3,931,504 | A |   | 1/1976  | Jacoby ........................... 235/153 |
|-----------|---|---|---------|-------------------------------------------|
| 4,430,728 | A |   | 2/1984  | Beitel et al. ................... 364/900  |
| 4,454,594 | A |   | 6/1984  | Heffron et al. ................. 364/900  |
| 5,643,086 | A |   | 7/1997  | Alcorn et al. .................. 463/29   |
| 5,671,412 | A | * | 9/1997  | Christiano ..................... 707/104.1 |
| 5,715,403 | A | * | 2/1998  | Stefik .......................... 705/44   |
| 5,762,552 | A |   | 6/1998  | Vuong et al. ................... 463/25   |
| 5,768,382 | A |   | 6/1998  | Schneier et al. ................ 380/23   |
| 5,836,817 | A |   | 11/1998 | Acres et al. ................... 463/26   |
| 5,851,149 | A |   | 12/1998 | Xidos et al. ................... 463/42   |
| 5,925,127 | A | * | 7/1999  | Ahmad .......................... 713/200  |
| 5,970,143 | A |   | 10/1999 | Schneier et al.                            |
| 5,999,808 | A | * | 12/1999 | LaDue ........................ 455/412.2  |
| 6,002,772 | A |   | 12/1999 | Saito                                      |
| 6,052,512 | A | * | 4/2000  | Peterson et al. ................ 709/220  |
| 6,099,408 | A |   | 8/2000  | Schneier et al. ................ 463/29   |
| 6,104,815 | A |   | 8/2000  | Alcorn et al. .................. 380/251  |
| 6,106,396 | A |   | 8/2000  | Alcorn et al. .................. 463/29   |
| 6,125,185 | A | * | 9/2000  | Boesch ......................... 380/285  |
| 6,149,522 | A |   | 11/2000 | Alcorn et al. .................. 463/29   |
| 6,165,072 | A | * | 12/2000 | Davis et al. .................... 463/29  |
| 6,169,976 | B1| * | 1/2001  | Colosso ........................ 705/59   |
| 6,178,510 | B1|   | 1/2001  | O'Connor et al. .............. 713/201   |
| 6,253,374 | B1|   | 6/2001  | Dresevic et al. ............... 717/11   |
| 6,264,561 | B1|   | 7/2001  | Saffari et al.                             |
| 6,285,868 | B1|   | 9/2001  | LaDue .......................... 455/410  |
| 6,364,769 | B1| * | 4/2002  | Weiss et al. .................... 463/29  |
| 6,368,219 | B1|   | 4/2002  | Szrek et al. .................... 463/42  |
| 6,446,257 | B1|   | 9/2002  | Pradhan et al. ................. 717/154  |

(Continued)

FOREIGN PATENT DOCUMENTS

EP          0715245 A1    6/1996

(Continued)

OTHER PUBLICATIONS

Copy of U.S. Appl. No. 09/520,404 (30 pages).

*Primary Examiner*—Gilberto Barron, Jr.
*Assistant Examiner*—Andrew L. Nalven
(74) *Attorney, Agent, or Firm*—Beyer Weaver & Thomas LLP

(57) ABSTRACT

A disclosed gaming machine may securely communicate with devices over a public network such as the Internet. The gaming machine utilizes a combination of symmetric and asymmetric encryption that allows a single gaming machine to securely communicate with a remote server using a public network. A wireless or wired communication gateway on the gaming machine may be used to access the public network. Using the encryption scheme, methods are described for providing game licenses, data acquisition and other gaming transactions, such as gaming machine software version management, gaming machine diagnostics and gaming machine configuration management, between a gaming machine and a remote server.

43 Claims, 8 Drawing Sheets

U.S. PATENT DOCUMENTS

| | | | |
|---|---|---|---|
| 6,449,687 B1 | 9/2002 | Moriya | 711/112 |
| 6,453,319 B1 | 9/2002 | Mattis et al. | 707/100 |
| 6,454,648 B1 | 9/2002 | Kelly et al. | 463/16 |
| 6,508,709 B1 | 1/2003 | Karmarkar | 463/42 |
| 2002/0045477 A1 | 4/2002 | Dabrowski | 463/29 |
| 2002/0049909 A1 | 4/2002 | Jackson et al. | 713/188 |
| 2002/0071557 A1 | 6/2002 | Nguyen | 380/251 |

FOREIGN PATENT DOCUMENTS

| | | |
|---|---|---|
| EP | 0744786 | 11/1996 |
| EP | 1061430 A1 | 12/2000 |
| EP | 1074955 A2 | 2/2001 |
| WO | WO 95/24689 | 9/1995 |
| WO | WO 96/00950 | 1/1996 |
| WO | WO 99/01188 | 1/1999 |
| WO | 02/05229 A2 | 1/2002 |

* cited by examiner

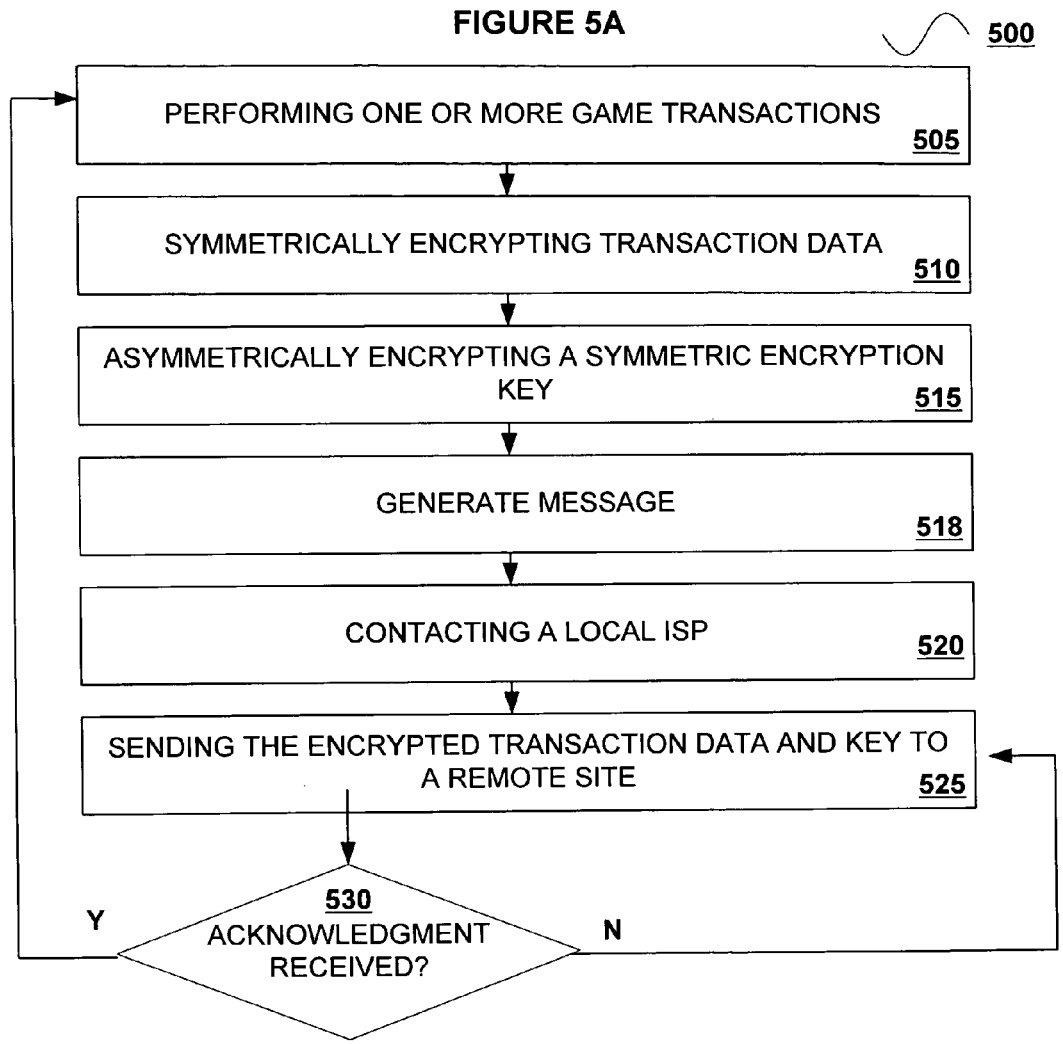

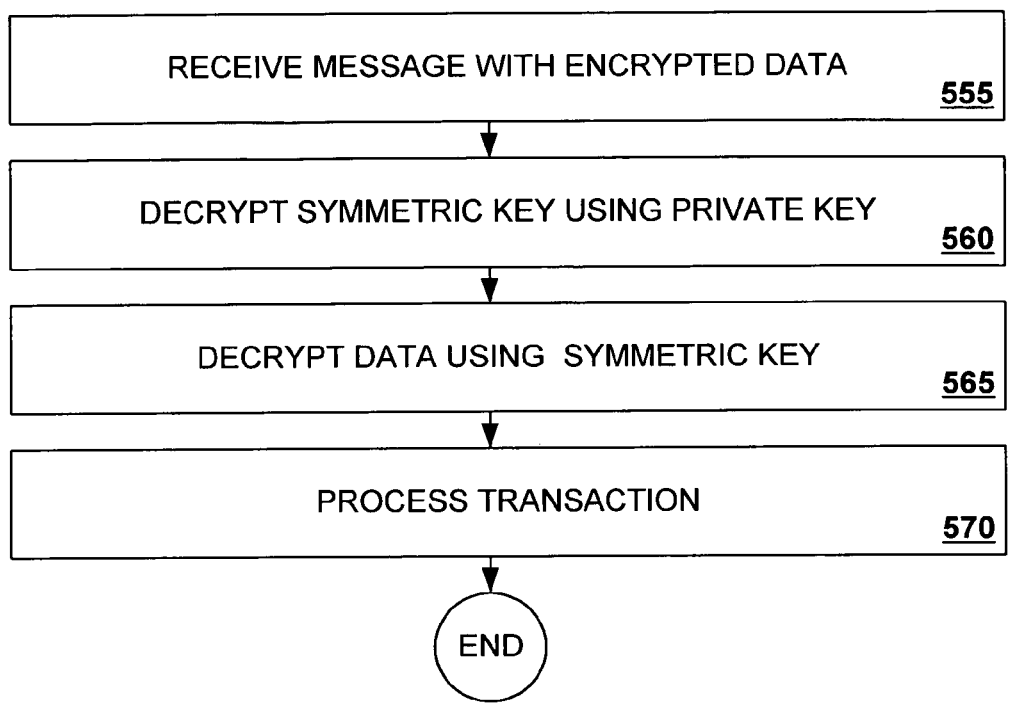

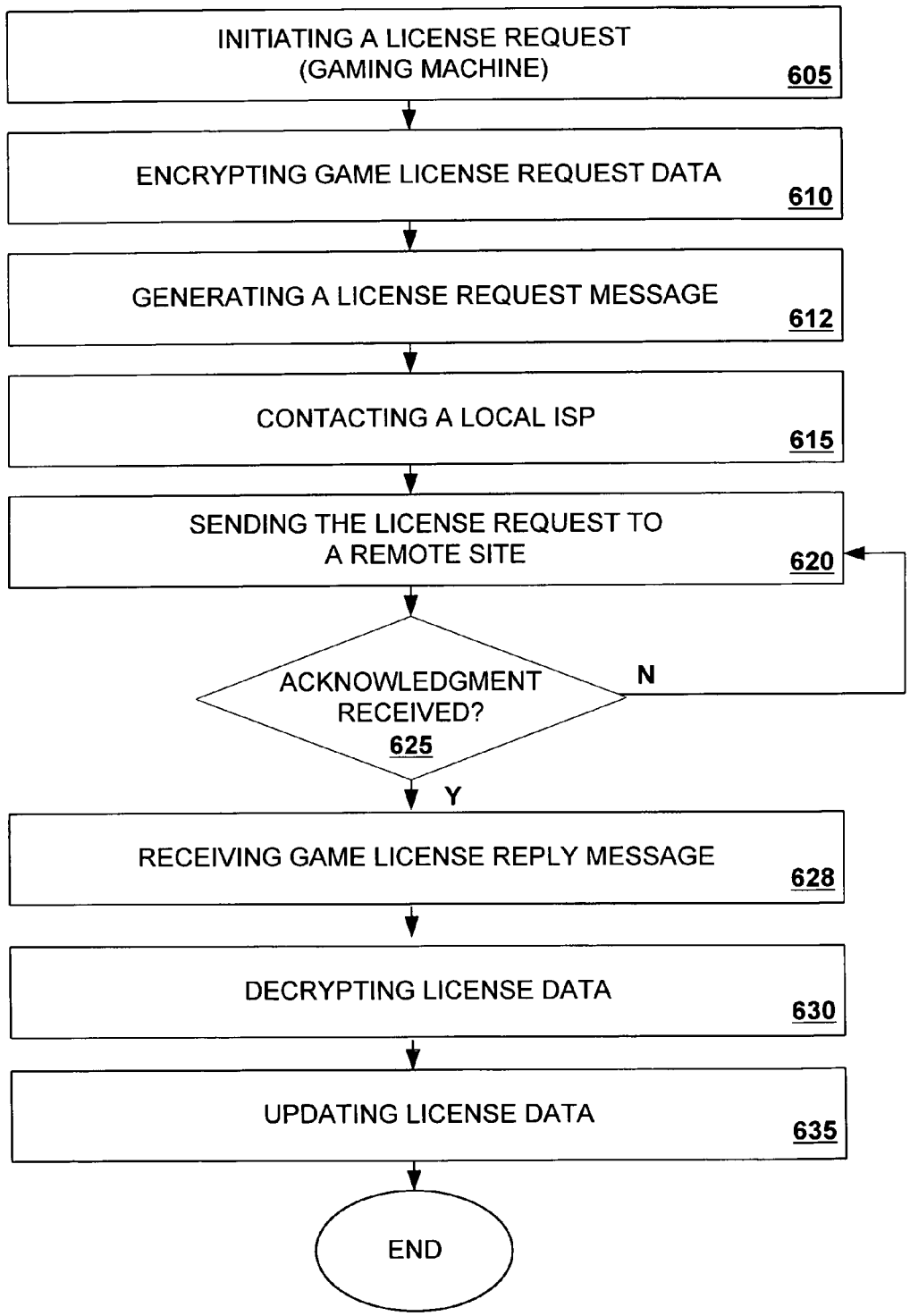

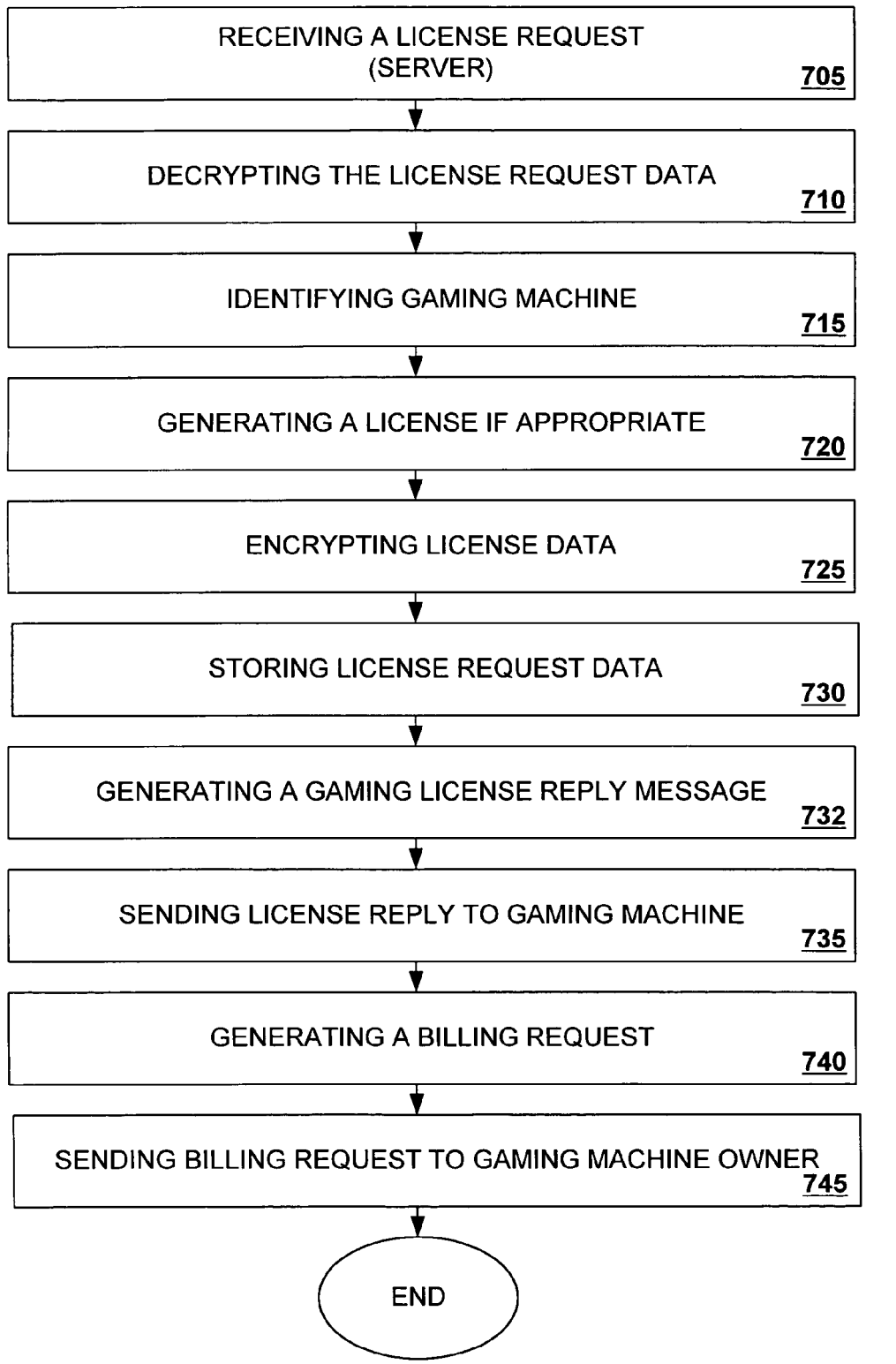

SECURED VIRTUAL NETWORK IN A GAMING ENVIRONMENT

BACKGROUND OF THE INVENTION

This invention relates to game playing services for gaming machines such as slot machines and video poker machines. More particularly, the present invention relates to providing methods of communication for game services such as licensing and accounting on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines via communication networks that link groups of gaming machines to a remote computer that provides one or more gaming services. As an example, gaming services that may be provided by a remote computer to a gaming machine via a communication network of some type include player tracking, accounting, cashless award ticketing, lottery, progressive games and bonus games.

Typically, network gaming services enhance the game playing capabilities of the gaming machine or provide some operational advantage in regards to maintaining the gaming machine. Thus, network gaming services provided to groups of gaming machines linked over a dedicated communication network of some type have become very popular in the gaming industry. In general, the dedicated communication network is not accessible to the public. To justify the costs associated with the infrastructure needed to provide network gaming services on a dedicated communication network, a certain critical number of gaming machines linked in a network of some type must utilize the service. Thus, many of the network gaming services are only provided at larger gaming establishments where a large number of gaming machines are deployed.

A progressive game network offering progressive game services is one example where a group of gaming machines are linked together using a dedicated network to provide a network gaming service. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot which justifies the costs associated with installing and maintaining the dedicated progressive game network.

Within the gaming industry, a particular gaming entity may desire to provide network gaming services and track the performance of all the gaming machines under the control of the entity. The gaming machines under the control of a particular entity may be globally distributed in many different types of establishments. Casinos, convenience stores, supermarkets, bars and boats are a few examples of establishments where gaming machines may be placed.

FIG. 1 is a block diagram depicting gaming machines distributed in different establishments partially connected by a dedicated communication network for a typical gaming entity currently operating in the gaming industry. In FIG. 1, the gaming entity utilizes a central office 142. The gaming machines, 102, 104, 106, 114, 116, 136 and 138 for the gaming entity are located in two casinos, 110 and 122, and a store 140. A gaming entity may operate hundreds, thousands or ten of thousands of gaming machines. Since gaming is allowed in many locations throughout the world, the two casinos, 110 and 122, the central office 142 and the store may be distributed over a wide geographic area. For instance, the casino 110 may be located in Atlantic City, N.J., the casino 122 may be located in Australia, the central office may be located in Las Vegas, Nev. and the store may be located in Reno, Nev.

Within the casinos, the gaming machines may be connected to one or more database servers via one or more dedicated networks. The database servers are usually located in the backroom of the casino. For instance, in casino 110, gaming machines 102, 104 and 106 are connected to a database server 100 via a dedicated network 108. The dedicated network 108 may be used to send accounting information and player tracking information from the gaming machines to the database server 110. In casino 122, the gaming machines 114, 116, 118 may send accounting information and player tracking information to a database server using the dedicated network 120. Other dedicated networks (not shown) in casinos, 110 and 112, may provide such network gaming services as bonus game play, progressive game play and cashless ticketing.

In casinos 110 and 122, the database servers 100 and 112 may store and process accounting data from the gaming machines in communication with the database servers. For instance, an accounting report detailing the performance of individual and groups of gaming machines may be generated from the data stored on the database servers 100 and 112. In addition, accounting data or reports may be sent to the database server 124 in the central office 142 from each casino. These reports may contain game performance data collected from a number of gaming machines as well as hotel operations data. The data from the casinos may be sent to the central office using an expensive dedicated leased line 132 using a frame relay network.

The database server 124 may be used to generate reports summarizing the performance of all the gaming machines within the gaming entity (e.g. casino 110, casino 122 and store 140). The reports may be accessed locally using the local access points 126 and 128 via the local network. In addition, reports may be remotely accessed using a dial in number for a limited number of users. For instance, an executive travelling on the road might view gaming machine performance data from the remote access point 134 where the remote access point 134 may be a hotel room.

For the store 140, the gaming machines, 136 and 138 may be leased by the store operator. However, the cost of a dedicated communication network for a small number of gaming machines is usually not justified. Thus, the gaming machines operate in a "stand alone" mode. While operating in "stand alone" mode, network gaming services are not available to these gaming machines. To obtain performance data for the gaming machines, 136 and 138, a route operator may regularly extract performance data from the machines and manually transmit the information to the central office 142. A route may consist of a number gaming machines located in various locations such as bars, convenience stores and supermarkets. Usually, the route operator manually extracts performance data for all of the gaming machines located on their route. For a large route, this process may be both time consuming and costly.

Within the gaming industry, there is some desire to provide centralized network gaming services, centralized data access and centralized data acquisition to all of the gaming machines or a larger proportion of gaming machines within a gaming entity. For the casinos, 110 and 122, the gaming machines are connected via local dedicated networks that do not generally allow, for security reasons, the gaming machines to communicate with devices located outside of the casino. For instance, in FIG. 1, the database server 124 may not directly communicate with gaming machine 102 or gaming machine 114. Further, as described above, a dedicated network is usually not cost effective for smaller gaming establishments. Thus, with the communication infrastructure described in FIG. 1 which is representative of the communication infrastructure currently available in the gaming industry, the implementation of centralized network gaming services, such as centralized data acquisition may be difficult.

A current barrier to providing centralized network gaming services and centralized data acquisition for gaming machines diversely distributed throughout a gaming entity is the complexity and costs of the dedicated communication networks currently used in the gaming industry. The costs of installing and maintaining a dedicated communication network typically limit the application of dedicated networks to large establishments with a large number of gaming machines. Further, even in the larger establishments, the dedicated network are usually only implemented locally and centralized network gaming services (e.g. from a central office) are usually not provided. In view of the above, it would be desirable to provide gaming communication methods for gaming machines that reduce the complexity of the gaming network environment, reduce the costs associated with adding new network gaming services and simplify the data acquisition process for gaming machines widely distributed within a gaming entity.

SUMMARY OF THE INVENTION

This invention addresses the needs indicated above by providing gaming machines that may securely communicate with devices over a public network such as the Internet. The invention provides a combination of symmetric and asymmetric encryption that allows a single gaming machine to securely communicate with a remote server using a public network. A wireless or wired communication gateway on the gaming machine may be used to access the public network. Using the encryption scheme, methods are described for providing game licenses, data acquisition and other gaming transactions, such as gaming machine software version management, gaming machine diagnostics and gaming machine configuration management, between a gaming machine and a remote server.

One aspect of the invention provides a method of sharing transaction data between a gaming machine and one or more remote servers. The method may be generally characterized as including: 1) performing one or more gaming transactions on the gaming machine; 2) symmetrically encrypting gaming transaction data generated from the one or more gaming transactions using a symmetric encryption key; 3) asymmetrically encrypting the symmetric encryption key using a public encryption key; and 4) sending a message including the encrypted gaming transaction data and the encrypted symmetric encryption key to the one or more remote servers. In addition the method may also include one or more of the following: a) prior to sending the encrypted gaming transaction data, contacting a local ISP and sending the message via the local ISP, b) looking up an IP address of the one or more remote servers, c) encapsulating said encrypted transaction data and said encrypted symmetric encryption key in multiple information packets and d) generating a message signature allowing the message to be unambiguously identified as being from the gaming machine and appending the message signature to the message. In particular embodiments, the remote server may be selected from the group consisting of a license server and a report server and the gaming transaction data may be accounting data, game usage data, game configuration data, software version data, a casino identification, a machine status data, a time stamp, service priority data, licensing information, billing data and maintenance data.

Another aspect of the invention provides a method of obtaining a game license on a gaming machine providing game play of one or more games. The method may be generally characterized as including: 1) encrypting game license request data; 2) generating a game license request message including the encrypted game license request data; 3) sending the game license request message to a remote server; 4) receiving a game license reply message from the remote server; and 5) when the game license reply message includes a game license, updating the license data on the gaming machine. The method may also include the following: a) looking up the IP address of said remote servers and sending the game license request message to the IP address of the remote server, b) generating a message signature allowing the game license reply message to be unambiguously identified as being from the gaming machine and c) authenticating the game license reply message.

In particular embodiments, the game license data may be symmetrically encrypted using a symmetric encryption key and the symmetric encryption key may be encrypted using a public key where the game license data may include a license expiration data, a game ID number, game usage data and machine identification information. In addition, the one or more games played on the gaming machine may be selected from the group consisting of a video slot game, a mechanical slot game, a lottery game, a video poker game, a video black jack game, a video lottery game, and a video pachinko game.

Yet another aspect of the present invention provides a method of obtaining a gaming report on a gaming machine providing game play of one or more games. The method may be generally characterized as including: 1) encrypting gaming report request data; 2) generating a gaming report request message including the encrypted game gaming report request data, 3) sending the gaming report request message to a remote server, 4) receiving a gaming report reply message from the remote server; and 5) when the gaming report reply message includes a gaming report, displaying said gaming report on the gaming machine.

Another aspect of the present invention provides a method of allowing a remote server to provide game licenses to one or more gaming machines in communication with the remote server. The method may be characterized as including: 1) receiving a game license request message from a gaming machine; 2) decrypting game license request data included in the game license request message; 3) identifying the gaming machine; 4) when a game license is allowed on the gaming machine, 5) generating a game license reply message wherein the game license reply message include game license reply data; and 6) sending the game license reply message to the gaming machine. The method may also include one or more of the following: a) determining a gaming machine owner; generating a billing request message and sending the billing request message to the gaming machine owner, b) encrypting the game license reply data wherein the game license reply data is symmetrically encrypted using a symmetric encryption key and the symmetric encryption key is encrypted using a public key, c) storing the license request data and storing the license reply data and d) authenticating the game license request message.

Another aspect of the invention provides a gaming machine that may be generally characterized as including: 1) a master gaming controller that controls a game played on the gaming machine and that communicates with one or more remote servers, 2) a network interface connected to the master gaming controller allowing communications between the master gaming controller and the one or more remote servers, 3) a memory storing a public encryption key and machine identification information for encrypting and authenticating communications between the master gaming controller and said one or more remote servers and 4) processor logic that (i) symmetrically encrypts at least one of gaming transaction data and gaming transaction requests using a symmetric encryption key, (ii) asymmetrically encrypts said symmetric encryption key with said public encryption key. In addition, the memory may store a private encryption key for decrypting data sent to the gaming machine. The network interface may be selected from the group consisting of a wireless interface and a wireline interface.

In particular embodiments, the gaming machine may include a) an antenna for transmitting and receiving communications over the wireless interface, b) a modem for transmitting and receiving communications over the wireline interface and c) a firewall for filtering communications received at the network interface. In another embodiment, a TCP/IP communication protocol may be used for the communications between the master gaming controller and said one or more remote server. The memory may be selected from the group consisting of an EPROM, a flash memory, a ROM, a RAM, a CD, a DVD, a tape drive, a hard drive and a non-volatile memory where the memory may also stores IP addresses of the one or more remote servers. The remote server may be selected from the group consisting of a game license server, a report server, a public key server, a game server, a software update server, a diagnostic server, a billing server, and a maintenance server.

These and other features of the present invention will be presented in more detail in the following detailed description of the invention and the associated figures.

BRIEF DESCRIPTION OF THE DRAWINGS

FIG. 5A is a flow chart depicting a method of sending transaction data between a gaming machine and one or more remote servers.

FIG. 5B is a flow chart depicting a method of receiving transaction data between a gaming machine and one or more remote servers.

FIG. 6 is a flow chart depicting a method of obtaining a game license on a gaming machine.

FIG. 7 is a flow chart depicting a method of providing a game license to one or more gaming machines using a remote server.

DESCRIPTION OF THE PREFERRED EMBODIMENTS

Figure 2:
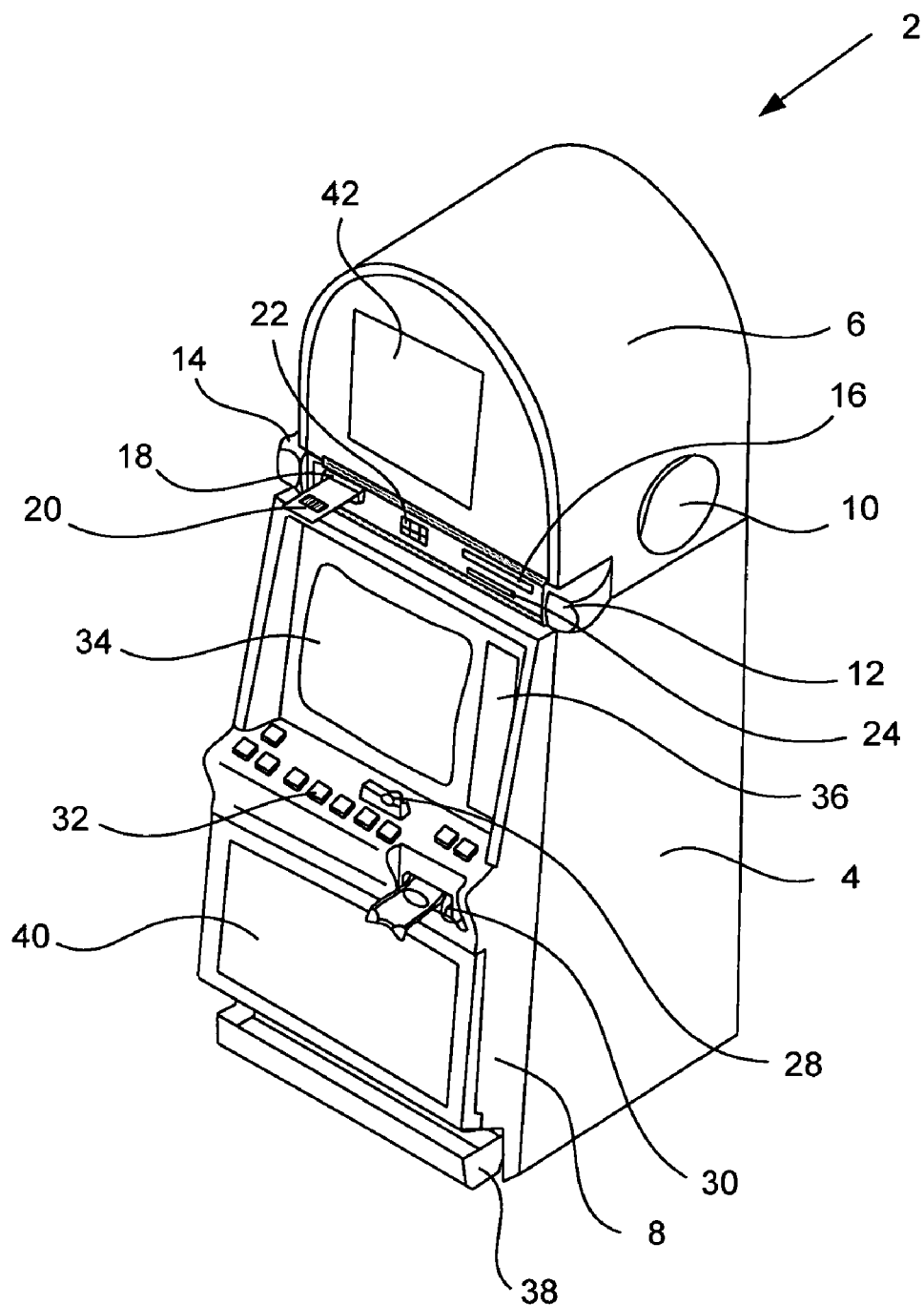
FIG. 2 is a perspective drawing of a gaming machine having a top box and other devices.

Turning first to FIG. 2, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2. Many possible games, including mechanical slot games, video slot games, video poker, video black jack, video pachinko and lottery, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Figure 1:
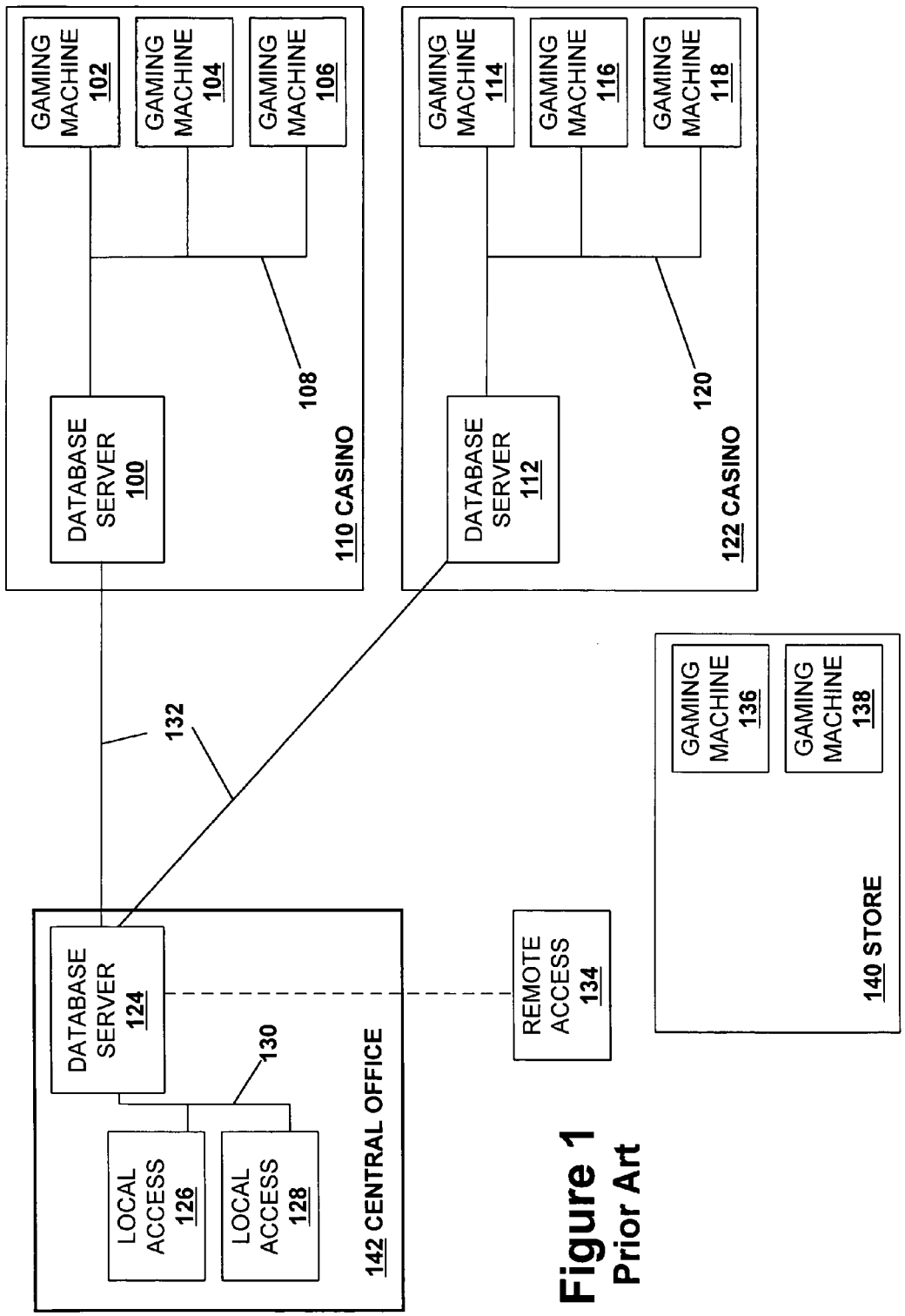
FIG. 1 is a block diagram depicting gaming machines distributed in different establishments partially connected by a dedicated communication network for a typical gaming entity currently operating in the gaming industry.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 3:
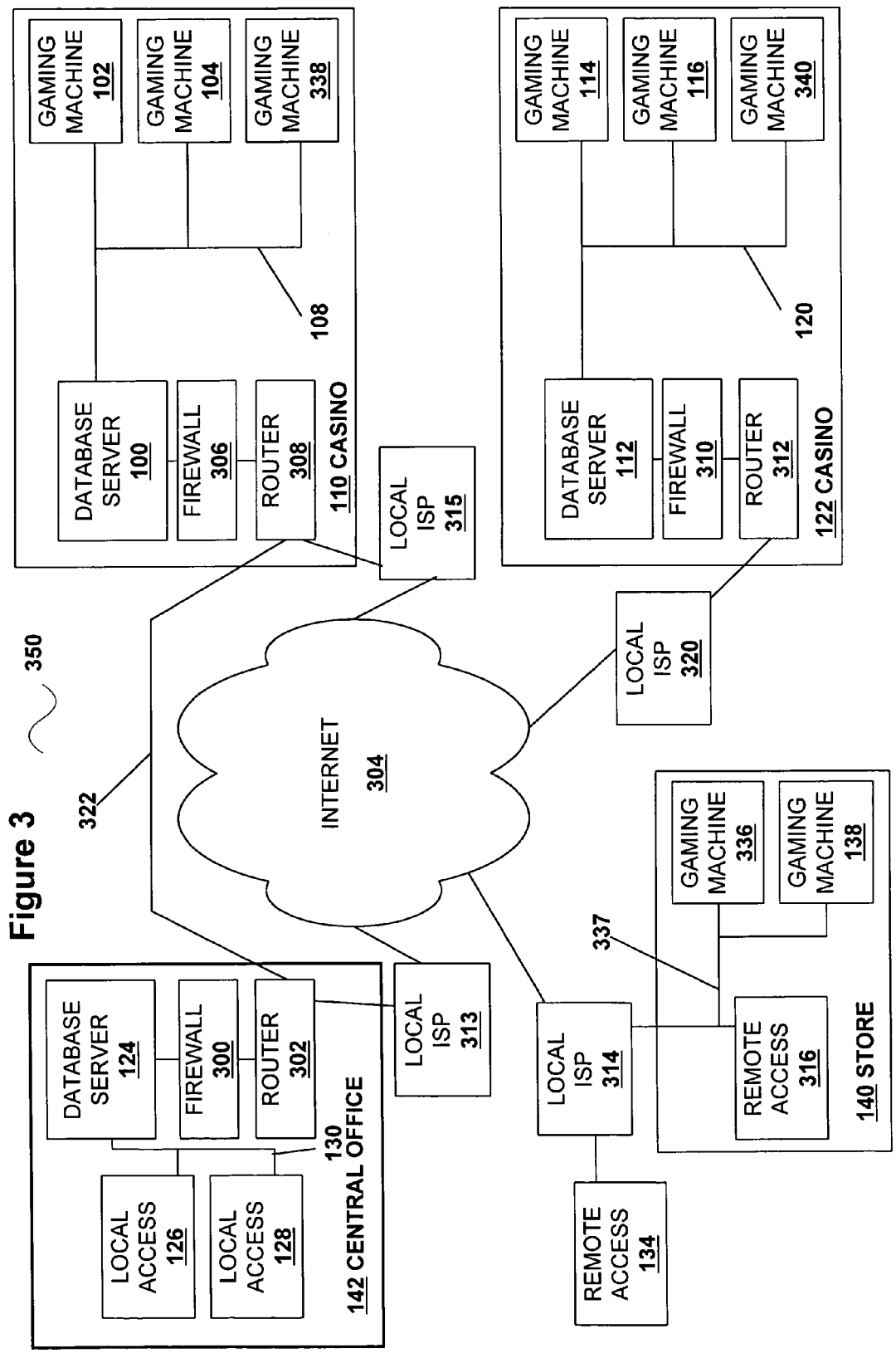
FIG. 3 is a block diagram depicting gaming machines distributed in different establishments connected using a secure virtual network.

FIG. 3 is a block diagram depicting gaming machines distributed in different establishments connected using a secure virtual network. Using the secure virtual network, network gaming services, data acquisition and data access may be provided to a large number of gaming machines distributed throughout a gaming entity 350 from a central location such as the central office 142. These services may be provided to gaming machines that have traditionally operated in a "stand alone" mode such as gaming machine 336 and 138 in the store 140. In FIG. 3, some of the communication infrastructure necessary to implement a secure virtual network for one embodiment of the present invention are described.

In one embodiment, the secured virtual network may be an IP based Virtual Private Networks (VPNs). An Internet-based virtual private network (VPN) uses the open, distributed infrastructure of the Internet to transmit data between corporate sites. A VPN may emulate a private IP network over public or shared infrastructures. A VPN that supports only IP traffic is called an IP-VPN. Virtual Private Networks provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols including RFC reports may be found from the VPN Consortium an industry trade group (http://www.vpnc.com, VPNC, Santa Cruz, Calif.).

In FIG. 3, a number of embodiments of IP VPN services are implemented to allow connectivity between the various gaming machines and database servers in the gaming entity. For instance, the gaming machine 336 in the store 140 may directly communicate with the database server 124 in the central office 142 via the internet 304. The communication path between the gaming machine 336 and the database server 124 may be the local ISP 314, a number of routers on the Internet 304, a local ISP 313 accessed by the central office 142, the router 302 and the firewall 300. The firewall may be hardware, software or combinations of both that prevent illegal access of the gaming machine by an outside entity connected to the gaming machine. For instance, an illegal access may be an attempt to plant a program in the database server that alters the operation of the database server or allows someone to steal data. The internal firewall is designed to prevent someone such as a hacker from gaining illegal access to the gaming machine and tampering with it in some manner. Firewalls and routers used in FIG. 3 may provided by CISCO Systems (San Jose, Calif.).

The network interface between the gaming machine 336 and the local ISP may be a wireline interface, such as a wired Ethernet connection, a wired ATM connection, or a wired frame relay connection, or a wireless interface, such as a wireless cellular interface. For instance, the gaming machine 336 may include a wireless modem and an antenna that allows the gaming machine to connect with the local ISP 314. As another example, the gaming machine may contain a dial-in modem, a DSL modem or a cable modem that allows that gaming machine 336 to connect with the local ISP 314 via a coaxial cable or phone line 337. The gaming machine 336 may also contain an internal firewall to prevent illegal access to the gaming machine. Other gaming machines, such as 338 and 340, located at various locations throughout the gaming entity 350 may also include the hardware described above and transmit information via a local ISP, such as 315 and 320, and the Internet 304, to a remote server such as the database server 124 in the central office 142.

Using the network interface, the gaming machine 336 may send game performance data, game usage information and gaming machine status information or any other information of interest generated on the gaming machine from one or more gaming transactions to the database server 124 located in the central office or some other remote server. Using this method, the need to manually gather data from the gaming machine using a route operator may be eliminated, which may reduce gaming machine operating costs and may provide better tracking of the performance of gaming machines, such as 336, that have traditionally operated in a "stand alone" mode.

For security purposes, any information transmitted from the gaming machine 336 over a public network to a remote server may be encrypted. The encryption may be performed by the master gaming controller. In one embodiment, the information from the gaming machine may be symmetrically encrypted using a symmetric encryption key where the symmetric encryption key is asymmetrically encrypted using a private key. The public key may be obtained by the gaming machine 336 from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. In addition, a different symmetric encryption key, selected from a pool such keys, is used for each transaction. Symmetric encryption and decryption is applied to most of the information because symmetric encryption algorithms tend to be 100–10,000 faster than asymmetric encryption algorithms.

Information needed to apply the encryption algorithm such as private keys and public keys may be stored on a memory residing in the gaming machine 336 where the memory may be a flash memory, an EPROM, a non-volatile memory, a ROM, a RAM, a CD, a DVD, a tape drive, a hard drive or other memory storage device. Typically, the public keys are stored on a writeable media such as a hard drive while the private keys are stored on a read only memory such as an EPROM or a CD-ROM. The same or a different memory residing on the gaming machine 336 may also include information used to authenticate communications between the gaming machine 336 and a remote server, such as 124. For instance, a serial number or some other identification numbers may be used by the firewall 300 or the database server 124 to authenticate the sender of a message.

The encrypted communications from the gaming machine 336 to a remote server may be implemented using a TCP/IP communication protocol. Thus, the encrypted information from the gaming machine may be encapsulated in multiple information packets and sent to the IP address of a remote server. The gaming machine 336 may contain a memory storing a number of IP addresses of remote servers or other devices where the gaming machine may send information. Prior to sending a message, the gaming machine may look up the IP address of the remote server or destination device.

For each information packet, the gaming machine may generate one or more signatures and may append them to the information packet. The signature may allow the recipient of the packet to unambiguously identify the sender of the packet as well as to determine if the correct amount of data was received. For instance, the signature may include a checksum of the data that was sent. Further, the information packet may contain routing information allowing subsequent communication with the gaming machine such as an IP address of the gaming machine. General details of these types of processes, such as TCP/IP implementation and data authentication, are described in the text "Mobile IP Unplugged" by J. Solomon, Prentice Hall and the text "Computer Networks", A. S. Tanenbaum, Prentice Hall. Both of these references are incorporated herein by reference in their entireties and for all purposes.

Using the communication infrastructure and methods described above a gaming machine or other device connected to a remote server may request one or more gaming services from a remote server. For instance, a gaming machine may send a game license request to the remote server 124. A gaming machine may store code to play one or more games controlled by the master gaming controller such as a video slot game, a mechanical slot game, a lottery game, a video poker game, a video black jack game, a video lottery game, and a video pachinko game. Traditionally, installing a new game has involved exchanging an EPROM (e.g. a read-only memory) containing the game on the gaming machine. Using the communication infrastructure described above, the gaming machine 336 may request a game license for one or more games stored in the gaming machine from a remote server acting as a game license server such as 124. The game license server may send a game license reply message containing a game license which allows the gaming machine to present the one or more games stored on the gaming machine. These game license requests may be performed prior to each game or the license may allow game play for some time period. For instance, the game license may be an annual license, a monthly license, a daily license, a per-use license or a site license. Details of the game license request and reply process between a gaming machine and a remote server are described with reference to FIGS. 6 and 7.

In another example, the gaming machine 336 may send a maintenance request message to a remote server when the gaming machine malfunctions. After receiving the maintenance request message, the remote server may perform one or more remote diagnostics on the gaming machine 336 via one or more diagnostic request messages. The remote diagnostics may include both software and hardware diagnostics. In addition, the remote server may develop service priority list based upon a plurality of maintenance requests received from a group of gaming machines in communication with the remote server. In yet another example, a remote server may obtain software version information or gaming configuration information, from gaming machine 336, by sending a software version request message or a gaming configuration request message to the machine. Information contained in these messages may be used to provide software updates and gaming configuration updates to the gaming machine 336.

In a further example, the gaming machine 336 may generate a digital signature or some other type of unique identification information and may send a digital signature verification request or an identification verification request to a remote server. The verification request may be part of an electronic find transfer. After receiving authorization from the remote server in an authorization reply, the gaming machine 336 may send a fund transfer request with fund transfer information to the remote server and may receive a fund transfer reply authorizing the gaming transaction.

A remote server may also provide performance reports or other services for the gaming machine 336. For instance, the gaming machine 336 may send a report request message to the remote server 124 requesting a performance report for the gaming machine over some prior time period. After remote server generates the report, it may be sent back to the gaming machine 336 or some other access point for display. For instance, the report may be displayed on a display screen of the gaming machine 336, a computer 316 located in the store 140 or on a portable network access point 134 located outside of the store.

An advantage of the virtual secure network described above is that it allows gaming services such as data acquisition, game licensing and report generation to be provided a single gaming machine without the use of a dedicated network which are typically expensive. This advantage may potentially increase the utility of a gaming machine while reducing the costs associated with operating and maintaining a machine. In particular, for gaming establishments with a small number of gaming machines operating in a "stand alone" mode, a virtual secure network may be the only viable way to provide cost effective gaming services via a network. The virtual secure network is enabled by an encryption scheme which utilizes multiple key encryption and symmetric rotating keys to provide secure communication of sensitive gaming data.

The methods described above may be applied and may be advantageous to any gaming machine in the gaming entity 350. Also, many different embodiments of the methods are possible. For instance, using a wireless network interface, gaming machine 338 in Casino 110 may send game license requests or other requests to the database server via the router 308, the dedicated line 322, router 302 and the firewall 300. As another example, using a wireline network interface, such as a wired Ethernet connection, a wired ATM connection or a wired frame relay connection, gaming machine 340 in casino 122 may send may send a gaming report request to the database server 100 in casino 110 via the database server 112, the firewall 310, the router 312, the local ISP 320, the internet 304, the local ISP 315, the router 308 and the firewall 306. When a dedicated communication network is used, encryption may be optional over the dedicated network, e.g. if a dedicated network was used between the gaming machine 340 and the database server 112, the gaming machine 340 may not use encryption to send information to the database server 112. However, the database server would apply an encryption scheme such as the one described above before sending out information over a public network. Returning to the example, the database server 100 may serve as a regional report server. After generating a gaming report reply message to the gaming report request message from gaming machine 340, the database server 100 may send a message to the database server 124 in the central office 142 acknowledging that a report was generated.

The virtual secure network may also allow remote access to gaming information such as gaming performance information at various gaming establishments in the gaming entity from mobile access points. For example, the remote access point 134 may be a portable computer with a wireless modem. Typically, the remote access point 134 will have a high level of security such as special access software. Using the remote access point 134, a user such as a travelling employee of the game entity may access gaming information at casino 110 or casino 122 via the local ISP 314. The access may be routed through the central office 142 or may be routed directly to one of the casinos bypassing the central office. In addition, different access privileges may be accorded to different remote users. For instance, one remote user may be able to access information from any establishment in the gaming entity while another may only be able to access information from a particular establishment.

Figure 4:
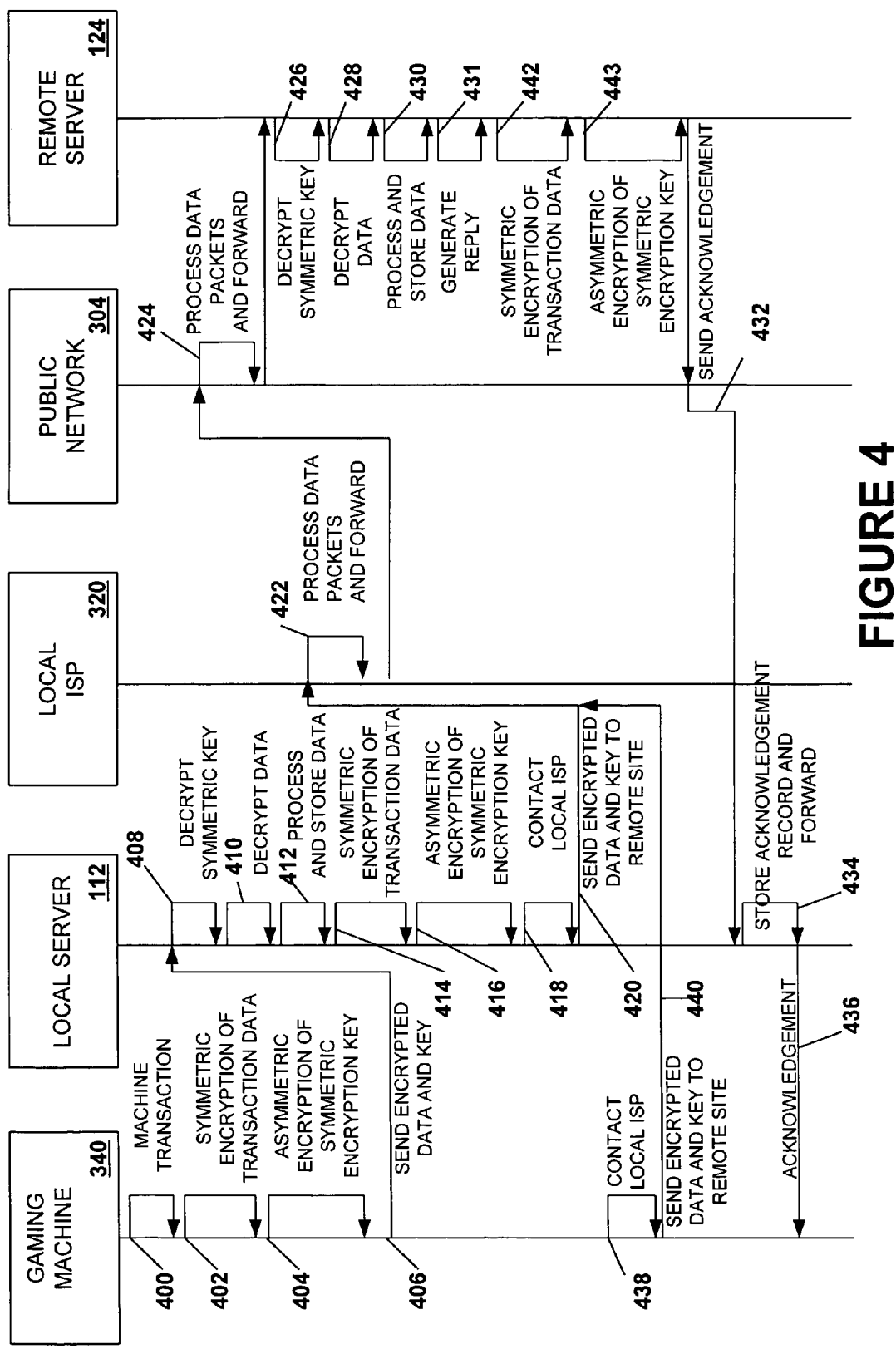
FIG. 4 is an interaction diagram showing communications between a gaming machine, local server, local ISP and remote server over a public network.

FIG. 4 is an interaction diagram showing communications between a gaming machine, local server, local ISP and remote server over a public network. The diagram provides some details of a communication process between a gaming machine 340 in casino 122 and the database server 122 in the central office 142 as described with reference to FIG. 3 for one embodiment of the present invention. In 400, the gaming machine 340 may perform a gaming transaction such as a coin-in, initiating a game play or a coin-out. In 402, the gaming machine 340 symmetrically encrypts gaming transaction data from one or more gaming transactions using a symmetric encryption key. In 404, the symmetric encryption key may be encrypted using an asymmetric encryption key such as public key in a public-private encryption scheme which may only be decrypted using a private key at the message destination. For each gaming transaction, a symmetric encryption key is selected from a pool of symmetric encryption keys. Thus, the symmetric encryption key varies from gaming transaction to gaming transaction. When a dedicated or private communication network is used and extra security is desired, the symmetric key may also be asymmetrically encrypted with an asymmetric encryption key which is non-public. In 406, a message may be generated and the encrypted data and key may be sent to a local server 112.

As previously described with reference to FIG. 3, the encrypted information may be encapsulated in multiple information packets using a TCP/IP communication protocol. In addition other communication protocols such as a frame relay communication protocol, an ATM communication protocol or combination of protocols may also be utilized. Prior to sending the data, the gaming machine may look up the IP address of the remote server which may be stored in a memory on the gaming machine. When a dedicated communication network is used between the gaming machine and the remote server, such as local server 112, the encryption process performed by the gaming machine may be optional. Prior to sending the message, the gaming machine 340 may generate one or more signatures that allow the receiver of the message to authenticate the sender of the message as well as the accuracy of the data contained in the message. These signatures may be appended to the message or incorporated in the message in some manner.

In one embodiment, the gaming machine 340 may bypass the local server and may send a message to the remote server 124 via the local ISP 320. In some embodiments, a local server may not be available to the gaming machine such as gaming machine 336 in the store 140 in FIG. 3. In 438, when communications are not established between the local ISP 320 and the gaming machine 340, the gaming machine may contact the local ISP 320 using a network interface of some type and establish communications with the local ISP 320. In 440, the gaming machine 340 may send a message with the encrypted gaming transaction data and the encrypted symmetric key to the IP address of the remote server 124 via the local ISP 320.

In 408, the local server 112 receives a message from the gaming machine 340. The local server 112 may authenticate that the message was sent from the gaming machine 340 and determine that the data sent in the message is complete. Next, the local server 112 may decrypt the symmetric encryption key using a private asymmetric encryption key stored on the local server. In 410, the local server decrypts the transaction information included in the message using the symmetric encryption key. In 412, the local server 112 may process and store the data generated from the gaming machine.

In 414, gaming transaction data from the gaming machine 340 may again be symmetrically encrypted using a symmetric encryption key. The gaming transaction data may also include additional gaming transaction data from other gaming machines. In one embodiment, the gaming transaction data may include game usage data that allows a game played on a gaming machine to be billed on a per use basis. In 416, the symmetric encryption key may be asymmetrically encrypted using an asymmetric encryption key such as a public key exchanged between the local server and the remote server 124 and a message containing the encrypted data may be generated. Prior to sending the message, the local server 112 may generate one or more signatures that allow the receiver of the message to authenticate the sender of the message as well as the accuracy of the data contained in the message. These signatures may be appended to the message or incorporated in the message in some manner. In 418, when a communication has not been established between the local server 112 and a local ISP 320, the local server may contact the local ISP 320 and establish communications using an appropriate communication protocol such as TCP/IP. In 420, the local server 112 may send a message with the encrypted gaming transaction data and the encrypted symmetric key to the IP address of the remote server 124 via the local ISP 320.

In 422, the local ISP 320 processes and forwards the message from the local server 112 or the gaming machine 340 to the public network 304. In 424, the public network processes the message from the local ISP 320 and forwards it to the remote server 124. Processing of the message by the local ISP 320 and the public network 304 may involve routing multiple data packets comprising the message.

In 426, the remote server receives a message from the gaming machine 340 or the local server 112. The remote server 124 may authenticate the sender of the message using one or more signatures included in the message and determine the accuracy of the data of the message. For instance, the remote server may generate a check sum of the data in the message and compare with a check sum of the data generated by the sender of the message. Next, the asymmetrically encrypted symmetric encryption key may be decrypted using a private key residing on the remote server 124. In 428, the symmetric key may be used to decrypt the symmetrically encrypted data. In 428, the remote server may process and store the data. The message from the gaming machine or local server 112 may include a request of some type for the remote server. In 430, the remote server may implement the request. For instance, the message may contain a request for a game license (See FIGS. 6 and 7), a request for a report or a request for some other game service.

In 431, the remote server may generate a reply message. The reply message may include an acknowledgement that the original message was received and may also include requested information. For instance, the remote server may request diagnostic data or a report of some type from the gaming machine. The data in the reply message may be encrypted. Thus, in 442, the transaction reply data may be symmetrically encrypted using a symmetric encryption key and in 443 the symmetric encryption key may be asymmetrically encrypted using the recipient's public key. When the reply message is received by a gaming device, such as the gaming machine 340 or the local server 112, the gaming device may decrypt (e.g., as in 426) the asymmetrically encrypted symmetric encryption key using a private key stored on the gaming device.

In 432, the remote server sends the reply message to the local server 112 and/or the gaming machine 340 via the public network 304. The remote server 124 may access the public network via an ISP local to the remote server 124. In 434, the local server may receive a reply message and store data included in the message. In some embodiments, the acknowledgement may be forwarded to the gaming machine 340. In other embodiments, the local server 112 may be by-passed or a local server 112 may not be available to the gaming machine 340 and the reply message may be received directly by the gaming machine 340 via the local ISP 320.

FIG. 5A is a flow chart depicting a method 500 of sending transaction data between a gaming machine and one or more remote servers. Although the method is described on a gaming machine for illustrative purposes, the method is not so limited and may be applied on other gaming devices such as the remote servers described above. Thus, as described with reference to FIG. 4, the gaming machines and remote servers may send messages with encrypted data to one another in a similar manner. In 505, the gaming machine performs one or more gaming transactions. For example, a gaming transaction may be a coin-in or a pay-out on the gaming machine. Information from one or more gaming transactions may be stored in a non-volatile memory located on the gaming machine. In 510, the gaming transaction data may be symmetrically encrypted using a symmetric encryption key. The encrypted gaming transaction data may include data generated from a single gaming transaction or multiple gaming transactions. The symmetric key may be selected from a pool of symmetric keys such that the symmetric key is varied each time gaming transaction data is encrypted. In 515, the symmetric encryption key may be asymmetrically encrypted using a public key that was previously exchanged between the gaming machine and the recipient of the message. In the case, where a dedicated network is used the asymmetric encryption key is non-public i.e. it is not readily available to the public.

In 518, the gaming machine generates a message containing the symmetrically encrypted gaming transaction data and the asymmetrically encrypted symmetric encryption key using a communication protocol of some type such as TCP/IP. The message may include additional information such as signatures to authenticate the sender of the message, signatures to validate the accuracy of the data included in the message and an IP address of the sender as well as other message routing information. The message may also include a request for the recipient to return information to the gaming machine. For instance, the gaming machine may request a remote server to provide a gaming license that allows a game to be played on the gaming machine.

In 520, when communications have not been established between the gaming machine and a local ISP, the gaming machine may contact a local ISP. The gaming machine may also send messages to a local ISP by sending the message first to a local server which may then forward the message to the local ISP. The gaming machine may contact the local ISP using a communication protocol such as TCP/IP and a network interface such as a wireless modem. In 525, the gaming machine sends the message generated in 518 to a remote site such a game license server, a report server or some other device via the local ISP. In 530, the gaming machine may determine when an acknowledgement message has been received from the remote site. When an acknowledgement message has not been received, the gaming machine may resend the message one or more times. When the acknowledgement message has been received, the gaming machine may repeat process 500.

FIG. 5B is a flow chart depicting a method 550 of receiving transaction data between a gaming machine and one or more remote. Although the method is described on a remote server for illustrative purposes, the method is not so limited and may be applied on other gaming devices such as the gaming machines described above. Thus, as described with reference to FIG. 4, the gaming machines and remote servers may receive and process messages with encrypted data from one another in a similar manner.

In 555, the remote server receives a message with encrypted gaming transaction data from a gaming machine, another remote server or some other gaming device. In 560, an asymmetrically encrypted symmetric encryption key included in the message in 555 is decrypted using a private key stored on the remote server. In 565, the decrypted symmetric encryption key may be used to decrypt symmetrically encrypted gaming transaction data included in the message. In 570, the decrypted gaming transaction data or any service requests contained in the message are processed. For instance, gaming transaction data in the message may be archived.

FIG. 6 is a flow chart depicting a method 600 of obtaining a game license on a gaming machine providing game play of one or more games. In 605, a gaming machine initiates a gaming license request. In one embodiment, the gaming license request may be initiated when a current gaming license on the gaming machine is about to expire. In another embodiment, the gaming license request may be initiated in response to a player on a gaming machine requesting a game play of a particular game. In 610, game license request data used to provide and implement gaming licenses is encrypted. The game license data may be encrypted using a symmetric encryption key and the symmetric encryption key may be asymmetrically encrypted using a public key. The game license request data may include the symmetric encryption key, a serial number of the software corresponding to one or more games or some other software identification number, a serial number of the gaming machine as well as other machine identification information, game owner identification information, game usage data including the number of times a gaming license has been used and license expiration data. The game usage data may be used to bill the gaming entity owning the gaming license for use of the game license. The software identification number in the gaming license data may correspond to one or more games such as a video slot game, a mechanical slot game, a video poker game, video blackjack game and video pachinko game.

In 612, a game license request message is generated with the encrypted game license request data. The game license request message may be sent to a remote server using a TCP/IP protocol. Thus, the game license request message may include an IP address of the remote server as well as an IP address of the gaming machine. The gaming machine may store the IP addresses of one or more remote servers in a memory residing on the gaming machine. Prior to sending the gaming license request message, the gaming machine may look-up the IP address of the destination remote server. The gaming license request message may include one or more signatures used by the recipient of the message to unambiguously identify the sender of the message and to validate the accuracy of the data contained in the message. The signatures may be generated by the gaming machine and appended to the message.

In 615, when communications between the gaming machine and a local ISP have not been established, the gaming machine may contact a local ISP and establish communications. In one embodiment, the gaming machine may not directly contact a local ISP. Instead, the gaming machine may contact and may send the gaming license request message to a local server which contacts a local ISP and sends the gaming license request message. In another embodiment, the gaming machine may send unencrypted gaming license request data to the local server. The local server may encrypt the gaming license request data, generate a gaming license request message and send the message to a remote server such as a gaming license request server.

In 620, the gaming machine sends the gaming license request message to a remote site such as a game license server via the local ISP. When a communication protocol such as TCP/IP is used, the message may be encapsulated in multiple information packets. In 625, the gaming machine determines whether an acknowledgement from the remote site has been received. When the acknowledgement from the remote site has not been received, the gaming machine may resend the message according to 620.

In 628, the gaming machine receives a game license reply message. The game license reply message may include a number of signatures used by the gaming machine to authenticate the sender of the message and to validate the data contained in the message. In 630, the gaming machine may decrypt an asymmetrically encrypted symmetric encryption key using a private key stored in memory on the gaming machine and then decrypt the game license reply data with the symmetric encryption key. The game license reply data may include a game license for one or more games available on the gaming machine. The game license may be an identification number of some type that allows software on the gaming machine corresponding to the license to be executed. The game license reply data may also include an expiration date for the license. In 635, the gaming machine may update game license data stored on the gaming machine when a new game license was included in the game license reply data. In one embodiment, the game license request message may include game usage data without a request for a new license. In this case, the game license reply message may include an acknowledgement that the game license request message was received but may not contain a new game license.

An advantage of the game license request method is that a gaming machine owner may be able operate gaming machines including many different types of games but only pay for each game on a per use basis. Thus, when a particular game is unpopular, the costs to the gaming machine operator are minimized as compared to when the gaming machine operator pays up front for a gaming machine with a game that receives little game play. Another advantage of the game license request method is that it may also be used for other types of game service requests. For instance, a report request message with encrypted report request data may be generated in the manner described above and sent to a remote server via a local ISP. When a report reply message is received via the local ISP containing a report, the report may be displayed to the gaming machine. In another example, a gaming machine may send a maintenance request message via a local ISP in a manner described above.

FIG. 7 is a flow chart depicting a method 700 of providing a game license to one or more gaming machines using a remote server. In 705, the remote server receives a game license request message from a gaming machine, local server or some other device. The message may have been received via a local ISP in communication with the remote server. As described above, although not shown in the flow chart, the remote server may also receive a report request, maintenance request or some other transaction request from the gaming machine, local server or remote device. After receiving the message, the remote server may authenticate the sender of the message using one or more signatures contained in the message and validate the accuracy of the data in the message using one or more signatures contained in the message. For instance, the remote server may generate a checksum on the data in the message and compare it with a checksum generated by the gaming machine on the data in the message which was appended to the message.

In 710, the remote server may decrypt a symmetric encryption key included in the game license request message using a private encryption key. With the symmetric encryption key, the remote server may decrypt the game license request data. The game license request data may include a serial number of the software corresponding to one or more games or some other software identification number, a serial number of the gaming machine as well as other machine identification information, game usage data including the number of times a gaming license has been used, license expiration data and game owner identification information.

In 715, using the serial number of the gaming machine and the other machine identification information the remote server may identify the gaming machine. A table of gaming machine identification information may be stored on the remote server. From the gaming machine identification information, the remote server may be able to determine the type of gaming machine and the games available on the gaming machine. In 720, when appropriate, the remote server may generate a new gaming license for the gaming machine. If the gaming license request message includes a request for a gaming license not available on the gaming machine or not enabled for some reason on the gaming machine, then the gaming license request may be denied. In another example, the game license request may include game usage information for billing purposes and a new game license may not be required.

In 725, when a new game license is generated, the game license reply data including the new game license may be encrypted with a symmetric encryption key and the symmetric encryption key may be asymmetrically encrypted with a public key. In other cases, the game license reply message may include an acknowledgement that the message was received but may not include a new game license. In 730, the information regarding the game license request such as the machine identification information, a type of game license request (e.g. type of game), a time of the request and whether the request was granted may be stored on the remote server.

In 732, a game license reply message with the game license reply data may be generated. In 735, via a local ISP and the Internet, the game license reply message may be sent to the local server and/or the gaming machine. In 740, a billing request message based upon the game usage data contained in the game license request or the type of license requested may generated. In 745, the billing request message may be sent to the gaming machine owner identified in the gaming license request message.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A method of obtaining a game license on a gaming machine providing a game play of one or more games, the method comprising:

providing a gaming machine comprising a 1) housing, 2) master gaming controller coupled to the housing that controls a game of chance played on the gaming machine and determines the outcome of the game of chance wherein the game license is associated with the game of chance; 3) a first input mechanism, coupled to the housing, for receiving and storing money or indicia of credit input to the gaming machine; and 4) an output mechanism, coupled to the housing, for outputting money or a tangible indicia of credit redeemable for cash from the gaming machine resulting from outcomes for the game of chance determined on the gaming machine;

under control of the master gaming controller, determining license data is needed for the game of chance while the game of chance is available for game play on the gaming machine;

under control of the master gaming controller, generating a game license request message to request the license data;

under control of the master gaming controller, sending the game license request message to a remove server;

under control of the master gaming controller, receiving a game license reply message from the remote server including the license data;

under control of the master gaming controller, updating the game license using the license data on the gaming machine.

2. The method of claim 1, further comprising, prior to sending the game license request message, contacting a local ISP and sending the game license request message via the local ISP.

3. The method of claim 1, further comprising, looking up an IP address of said remote server and sending the game license request message to the IP address of said remote server.

4. The method of claim 1, further comprising, encapsulating the game license request message in multiple information packets.

5. The method of claim 1, further comprising, generating a message signature allowing the game license reply message to be unambiguously identified as being from the gaming machine and appending said message signature to the game license request message.

6. The method of claim 1, wherein the game license data is symmetrically encrypted using a symmetric encryption key and the symmetric encryption key is encrypted using a public key.

7. The method of claim 1, wherein the game license data includes a license expiration data, a game ID number, game usage data, software version data, operator identification data, time data, data date and machine identification information.

8. The method of claim 1, further comprising: authenticating the game license reply message.

9. The method of claim 1, wherein said one or more games are selected from the group consisting of a video slot game, a mechanical slot game, a lottery game, a video poker game, a video blackjack game, a video lottery game, and a video pachinko game.

10. The method of claim 1, wherein the game license is selected from the group consisting of a site license, an annual license, a monthly license, a daily license or a per-use license.

11. The method of claim 1, further comprising, under control of the master gaming controller on the gaming machine, encrypting information sent in the game license request message.

12. The method of claim 1, further comprising,
under control of the master gaming controller, after determining the amount of money or indicia of credit input into the gaming machine, receiving a wager on the game of chance using the money or indicia of credit input into the gaming machine wherein the license data for the game of chance has been obtained from the remote server;
under control of the master gaming controller, generating and displaying an outcome to the game of chance; and
under control of the master gaming controller, determining an amount of money or a tangible indicia of credit redeemable for money to output from the gaming machine.

13. The method of claim 1, further comprising, storing to a memory accessible to the master gaming controller of plurality of different types of games of chance available for game play on the gaming machine.

14. The method of claim 13, further comprising, monitoring a licensing status for the plurality of different types of games of chance.

15. The method of claim 13, further comprising:
sending game usage data associated with plurality of different types of games of chance to the remote server.

16. The method of claim 1, further comprising, monitoring a licensing status for the game of chance.

17. The method of claim 1, further comprising, determining the game of chance is being utilized according to conditions specified in the game license.

18. A method of obtaining a gaming report on a gaming machine providing game play of one or more games, the method comprising:
providing a gaming machine comprising a 1) housing, 2) a master gaming controller coupled to the housing that controls a game of chance played on the gaming machine and determines the outcome of the game of chance; 3) a first input mechanism, coupled to the housing, for receiving and storing money or indicia of credit input to the gaming machine; and 4) an output mechanism, coupled to the housing, for outputting money or a tangible indicia of credit redeemable for cash from the gaming machine resulting from outcomes determined on the gaming machine;
under control of the master gaming controller, determining an amount of money or indicia of credit input to the gaming machine;
under control of the master gaming controller, after determining the amount of money or indicia of credit input into the gaming machine, receiving a wager on a game of chance using the money or indicia of credit input into the gaming machine;
under control of the master gaming controller, generating and displaying an outcome to the game of chance; and
under control of the master gaming controller, determining an amount of money or indicia of credit to output from the gaming machine;
under control of the master gaming controller, sending game transaction data resulting from a play of the game of chance to remote server wherein the game transaction data is processed by the remote server to generate a gaming report related to the performance of one or more gaming machines;
under control of the master gaming controller, encrypting gaming report request data;
under control of the master gaming controller, generating a gaming report request message including the encrypted game gaming report request data;
under control of the master gaming controller, sending the gaming report request message to a remote server;
under control of the master gaming controller, receiving a gaming report reply message from the remote server including a gaming report; and
under control of the master gaming controller, displaying said gaming report on the gaming machine.

19. The method of claim 18, further comprising, prior to sending the gaming report request message, establishing communications with a local ISP and sending the gaming report request message via the local ISP.

20. The method of claim 19, further comprising, receiving the gaming report reply message via the local ISP.

21. The method of claim 18, further comprising, looking up the IP address of said remote server and sending the gaming report request message to the IP address of said remote server.

22. A gaming machine comprising:
a housing;
a master gaming controller, coupled to the housing, that controls a game of chance played on the gaming machine and that communicates with one or more remote servers wherein the game of chance comprises receiving a wager amount on the game of chance, determining an outcome for the game of chance and displaying the outcome for the game of chance and wherein a game license is associated with the game of chance;
wherein the master gaming controller is adapted to 1) determine that license data is needed for the game chance while the game of chance is available for game play on the gaming machine; 2) generate a game license request message to request the license data; 3) send the game license recluest message to a remote server; 4) receive a game license reply message from the remote server including the license data; and 5) update the game license with the license data;
a display, coupled to the housing, for displaying the outcome of the game of chance;
a network interface, coupled to the housing connected to the master gaming controller allowing communications between the master gaming controller and the one or more remote servers;
a first input mechanism, under control of the master gaming controller, and coupled to the housing, for receiving and storing money or indicia of credit input to the gaming machine;
a second input mechanism, in communication with the master gaming controller and coupled to the housing, including one or more input buttons for making a wager on the game of chance;
an output mechanism mechanism, under control of the master gaming controller and coupled to the housing, for outputting money or a tangible indicia of credit redeemable for money from the gaming machine resulting from outcomes determined on the gaming machine; and a memory for storing encryption information.

23. The gaming machine of claim 22, wherein the network interface is selected from the group consisting of a wireless interface and a wireline interface.

24. The gaming machine of claim 23, further comprising: an antenna for transmitting and receiving communications over the wireless interface.

25. The gaming machine of claim 23, further comprising: a modem for transmitting and receiving communications over the wireline interface or wireless interface.

26. The gaming machine of claim 22, further comprising: a firewall for filtering communications received at the network interface.

27. The gaming machine of claim 22, wherein the game of chance played on the gaming machine is at least one of a video slot game, a mechanical slot game, a lottery game, a video poker game, a video black jack game, a video lottery game, and a video pachinko game.

28. The gaming machine of claim 22, wherein at least one of a TCP/IP communication protocol, ATM communication protocol and a frame relay communication protocol is used for the communications between the master gaming controller and said one or more remote servers.

29. The gaming machine of claim 22, wherein the memory is selected from the group consisting of an EPROM, a flash memory a ROM, a RAM, a CD, a DVD, a tape drive, a hard drive and a non-volatile memory.

30. The gaming machine of claim 22, wherein the gaming transaction data is selected from the group consisting of accounting data, game usage data, game configuration data, software version data, a casino identification, a machine status data, a time stamp, service priority data, game licensing information, billing data, diagnostic data, digital signature data, identification data, fund transfer data, configuration data and maintenance data.

31. The gaming machine of claim 22, wherein the gaming transaction request is selected from the group consisting of a game license request, a report request, a maintenance request, a software version request, a billing request a digital signature request, an identification request, a fund transfer request, a configuration request and a diagnostic request.

32. The gaming machine of claim 31, further comprising, a display for displaying a report received in reply to the report request.

33. The gaming machine of claim 22, wherein the remote server is a selected from the group consisting of a game license server, a report server a public key server, a game server, a software update server, a diagnostic server, a billing server, a gaming machine and a maintenance server.

34. The gaming machine of claim 22, wherein the memory stores IP addresses of said one or more remote servers.

35. The gaming machine of claim 22, wherein the memory stores a private key for decrypting encrypted data.

36. The gaming machine of claim 22, further comprising processor logic that
    (i) asymmetrically decrypts said symmetric encryption key with a private encryption key,
    (ii) symmetrically decrypts at least one of gaming transaction data and gaming transaction replies using said symmetric encryption key.

37. The gaming machine of claim 36, wherein the gaming transaction reply is selected from the group consisting of a game license reply, a report reply, a maintenance reply, a software version reply, a billing reply, a digital signature authentication reply, an identification reply, a fund transfer reply, a configuration reply and a diagnostic reply.

38. The gaming machine of claim 36, wherein the memory stores said private encryption key.

39. The gaming machine of claim 22, wherein the symmetric key is selected from a pool of symmetric keys.

40. The gaming machine of claim 39, wherein a first gaming transaction data is encrypted using a first symmetric encryption key and a second gaming transaction data is encrypted using a second symmetric encryption key and wherein said first encryption key and said second encryption key are selected from the pool of symmetric keys.

41. The gaming machine of claim 22, wherein the master gaming controller is further adapted to monitor a status of the game license.

42. The gaming machine of claim 22, further comprising: a first memory device accessible to the master gaming controller for storing a plurality of different types. of games of chance.

43. The gaming machine of claim 22, wherein the master gaming controller is further adapted to generate on the display a list of games of chance available for play on the gaming machine.

* * * * *